US00RE45185E

(19) United States
(12) Reissued Patent
Davies

(10) Patent Number: US RE45,185 E
(45) Date of Reissued Patent: Oct. 14, 2014

(54) RIFLE HANDGUARD SYSTEM WITH INTEGRATED BARREL NUT

(75) Inventor: Robert Bruce Davies, Tempe, AZ (US)

(73) Assignee: David Stanowski, Galveston, TX (US)

(21) Appl. No.: 11/361,036

(22) Filed: Feb. 23, 2006

Related U.S. Patent Documents

Reissue of:
(64) Patent No.: 6,694,660
Issued: Feb. 24, 2004
Appl. No.: 10/105,700
Filed: Mar. 25, 2002

(51) Int. Cl.
*F41A 21/00* (2006.01)

(52) U.S. Cl.
USPC ..... 42/75.01; 42/71.01; 42/75.02; 42/75.03; 89/14.1

(58) Field of Classification Search
USPC ..... 42/71.01, 75.01, 75.02, 75.03; 89/14.1
See application file for complete search history.

(56) References Cited

U.S. PATENT DOCUMENTS

| | | | | |
|---|---|---|---|---|
| 1,971,230 | A * | 8/1934 | Nikoloff | 408/215 |
| 2,457,945 | A * | 1/1949 | Von Soden | 411/303 |
| 3,090,150 | A * | 5/1963 | Stoner | 42/71.01 |
| 3,144,895 | A * | 8/1964 | Linger | 411/282 |
| 3,566,744 | A | 3/1971 | Stoner | |
| 3,664,226 | A * | 5/1972 | Gonzalez | 411/2 |
| 3,849,925 | A * | 11/1974 | Mayer | 42/75.02 |
| 3,877,167 | A * | 4/1975 | Keppeler | 42/75.02 |
| 3,939,589 | A | 2/1976 | Tellie | |
| 4,536,982 | A | 8/1985 | Bredbury et al. | |
| 4,654,993 | A | 4/1987 | Atchisson | |
| 4,663,875 | A | 5/1987 | Tatro | |
| 4,765,224 | A * | 8/1988 | Morris | 89/191.01 |
| 4,927,302 | A * | 5/1990 | Beaty | 408/221 |
| 5,010,676 | A | 4/1991 | Kennedy | |
| 5,198,600 | A * | 3/1993 | E'Nama | 42/90 |
| 5,343,650 | A * | 9/1994 | Swan | 42/117 |
| 5,398,530 | A * | 3/1995 | Derman | 70/58 |
| 5,412,895 | A | 5/1995 | Krieger | |
| 5,490,746 | A * | 2/1996 | Baker | 408/123 |
| 5,513,461 | A | 5/1996 | Weldle | |

(Continued)

FOREIGN PATENT DOCUMENTS

| | | |
|---|---|---|
| DE | 2157420 | 5/1973 |
| EP | 0048223 | 5/1982 |
| GB | 0720620 | 12/1954 |

OTHER PUBLICATIONS

C-More Systems Quad-Rail Handguard, http://www.cmore.com/quadrail.html (Sep. 8, 2001).*

(Continued)

*Primary Examiner* — Daniel J Troy

(57) ABSTRACT

A handguard system for use on a rifle having a barrel and a receiver, the hand guard system includes a barrel nut having an inner surface with a threaded portion adapted to threadably engage the receiver for securing the barrel to the receiver and an outer surface, and a tubular handguard having an end. The tubular handguard is receivable about the barrel and is received about the barrel nut, engaging the outer surface thereof.

REEXAMINATION RESULTS

The questions raised in reexamination proceeding No. 90/008,357, filed Dec. 1, 2006, have been considered, and the results thereof are reflected in this reissue patent which constitutes the reexamination certificate required by 35 U.S.C. 307 as provided in 37 CFR 1.570(e) for *ex parte* reexaminations, or the reexamination certificate required by 35 U.S.C. 316 as provided in 37 CFR 1.997(e) for *inter partes* reexaminations.

7 Claims, 4 Drawing Sheets

(56) References Cited

U.S. PATENT DOCUMENTS

| | | | | | |
|---|---|---|---|---|---|
| 5,590,484 | A * | 1/1997 | Mooney et al. | 42/111 |
| 5,662,445 | A * | 9/1997 | Harbottle et al. | 411/433 |
| 5,826,363 | A * | 10/1998 | Olson | 42/75.01 |
| 5,952,602 | A | 9/1999 | Gussalli Beretta | |
| 5,987,797 | A * | 11/1999 | Dustin | 42/75.02 |
| 6,250,198 | B1 | 6/2001 | Vendetti et al. | |
| 6,295,751 | B1 * | 10/2001 | Piwonski | 42/1.15 |
| 6,374,528 | B1 | 4/2002 | Davis et al. | |
| 6,418,654 | B1 | 7/2002 | Trois et al. | |
| 6,490,822 | B1 * | 12/2002 | Swan | 42/71.01 |
| 6,499,245 | B1 * | 12/2002 | Swan | 42/71.01 |
| 6,671,990 | B1 * | 1/2004 | Booth | 42/75.01 |
| 6,694,660 | B1 | 2/2004 | Davies | |
| RE39,465 | E * | 1/2007 | Swan | 42/71.01 |
| 2003/0106252 | A1 * | 6/2003 | Hines | 42/90 |

OTHER PUBLICATIONS

Holmes, Bill. Home Workshop Guns for Defense and Resistance. Boulder, Colorado: Paladin Press, Nov. 1997 ISBN 13: 978-0-87364-948-3.*

Olympic Arms Free Floating Integrated Rail System, Printed Publication date Dec. 3, 2001.*

* cited by examiner

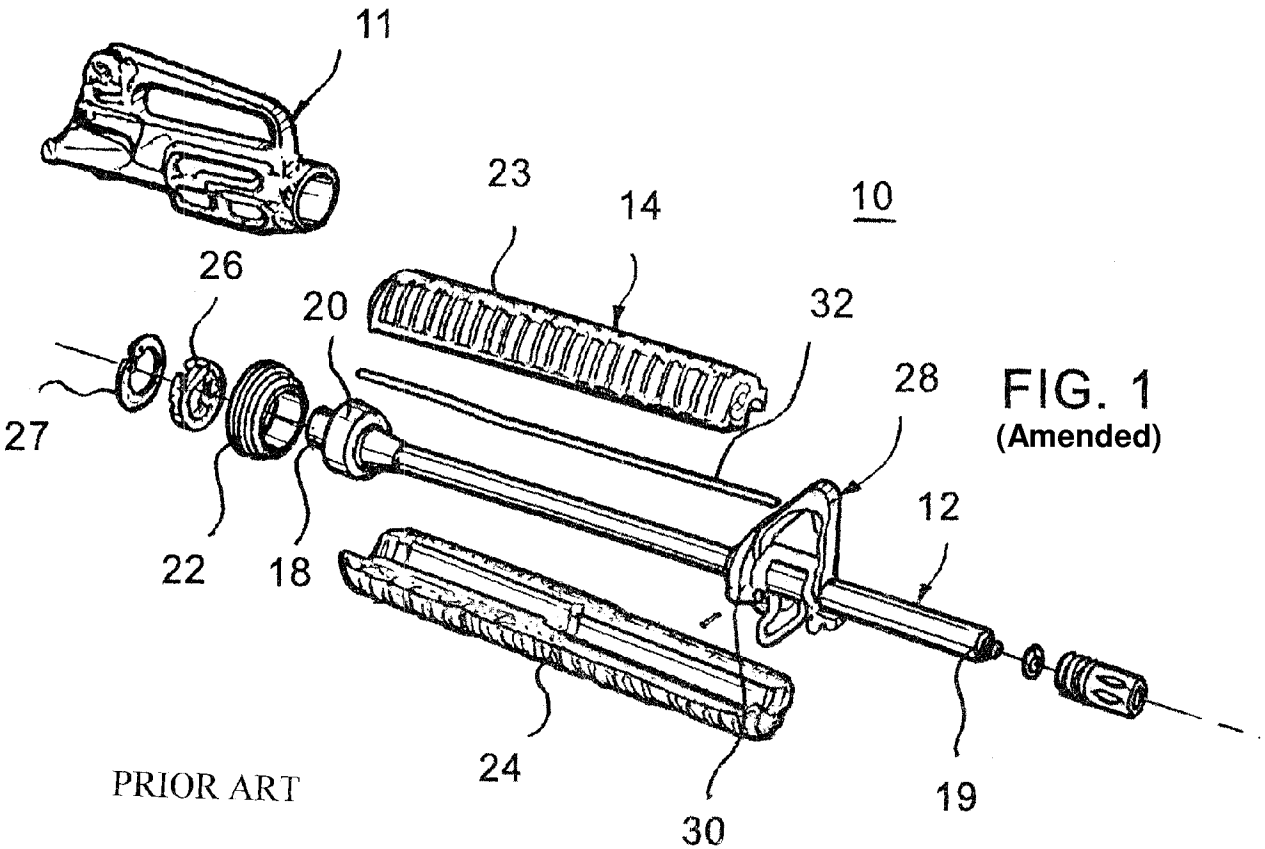
FIG. 1
(Amended)
PRIOR ART

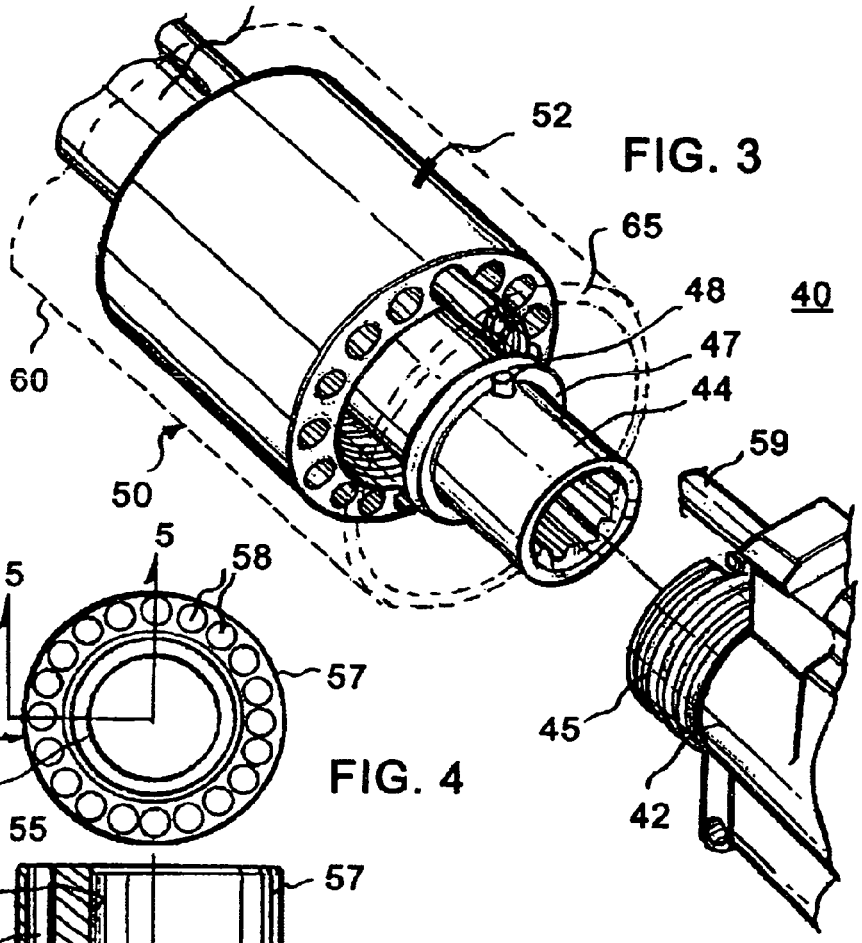
FIG. 3
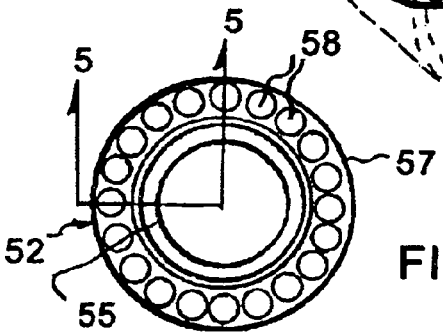
FIG. 4
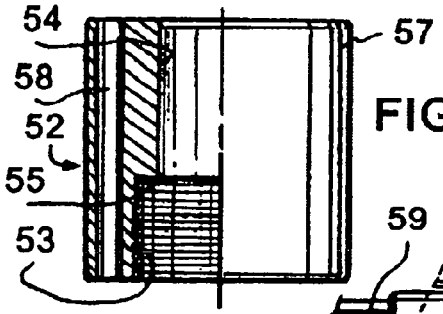
FIG. 5
FIG. 6
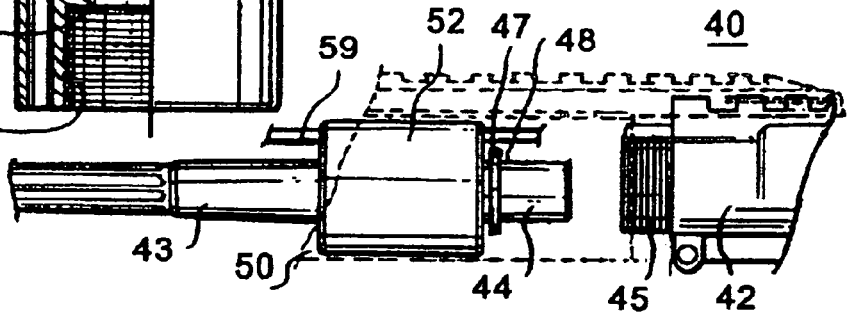

RIFLE HANDGUARD SYSTEM WITH INTEGRATED BARREL NUT

Matter enclosed in heavy brackets [ ] appears in the original patent but forms no part of this reissue specification; matter printed in italics indicates the additions made by reissue.

*This application is a reissue of U.S. Pat. No. 6,694,660. Application Ser. No. 90/008,357 is a reexamination of U.S. Pat. No. 6,694,660. Application Ser. No. 12/860,083 is a continuing reissue of this application. Application Ser. No. 12/897,846 is a continuing reissue of this application. Application Ser. No. 12/870,838 is a continuation of this application and is now abandoned.*

FIELD OF THE INVENTION

This invention relates to rifle accessories.

More particularly, the present invention relates to handguards for rifles.

BACKGROUND OF THE INVENTION

Long guns, and in particular rifles, have long been known. Rifles, due to their length, are typically fired using two hands. One hand is placed proximate the trigger assembly and the other is typically placed down the barrel from the trigger assembly. Rifles conventionally include a stock fabricated of wood. The stock typically includes a fore stock which extends some distance down the barrel. The fore stock is grasped by the shooter to provide balance and facilitate aiming the rifle. The shooter's hand is protected from the heat of the barrel during firing by the fore stock. Many modern rifles often employ synthetic materials for the stock, and still employ a fore stock. Other rifles do not include a single stock, but have a receiver to which a butt stock and a barrel are attached. The hand of a shooter is protected from the barrel by a handguard attached to the barrel. The M16 with its various permutations is an example of this type of rifle.

In an M16, a handguard consists of an upper and a lower handguard fitted around the barrel and attached thereto at both ends. While effective for protecting the hand of a shooter, pressure on and from the handguard can cause minor flexing of the barrel. Flexing or distortion of the barrel can cause sighting problems and bullet deflections, each of which is detrimental to accuracy. Additionally, multiple parts are required for attachment of the handguard, increasing complexity, cost and difficulty of attachment.

It would be highly advantageous, therefore, to remedy the foregoing and other deficiencies inherent in the prior art.

Accordingly, it is an object of the present invention to provide a new and improved handguard system with attachment at only one end.

Another object of the invention is to provide a handguard system which can be employed on existing rifles.

And another object of the invention is to provide a handguard system that is easily installed and aligned.

And yet another object of the invention is to provide a handguard system which will improve accuracy.

SUMMARY OF THE INVENTION

Briefly, to achieve the desired objects of the Instant invention in accordance with a preferred embodiment thereof, provided is a handguard system for use on a rifle having a barrel and a receiver. The hand guard system includes a barrel nut having an inner surface with a threaded portion adapted to threadably engage the receiver for securing the barrel to the receiver and an outer surface, and a tubular handguard having an end. The tubular handguard is receivable about the barrel and is received about the barrel nut, engaging the outer surface thereof.

In a more specific aspect, provided is an extension rail coupled to the handguard. The extension rail includes a receiver portion extending beyond the handguard, a dovetail groove formed in an underside of the receiver portion of the extension rail having a cross-sectional shape substantially identical to a cross-sectional shape of the rail on the receiver, for receipt of the rail therein, and fastening members for fastening the extension rail to the rail. A portion of the tubular handguard underlying the extension rail is removed to form a channel therebetween.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is an exploded perspective view illustrating [an] *a conventional* upper receiver and barrel assembly of an M16A2 rifle;

FIG. 3 is an exploded perspective view of the handguard system and the integrated barrel nut according to the present invention;

FIG. 4 is an end view of the integrated barrel nut of the handguard system of FIGS. 2 and 3;

FIG. 5 is a side view of the integrated barrel nut of FIG. 4, with a portion 5-5 cut away;

FIG. 6 is a partially exploded side view illustrating a portion of a rifle with the handguard system according to the present invention;

DETAILED DESCRIPTION OF THE PREFERRED EMBODIMENT

Figure 2:
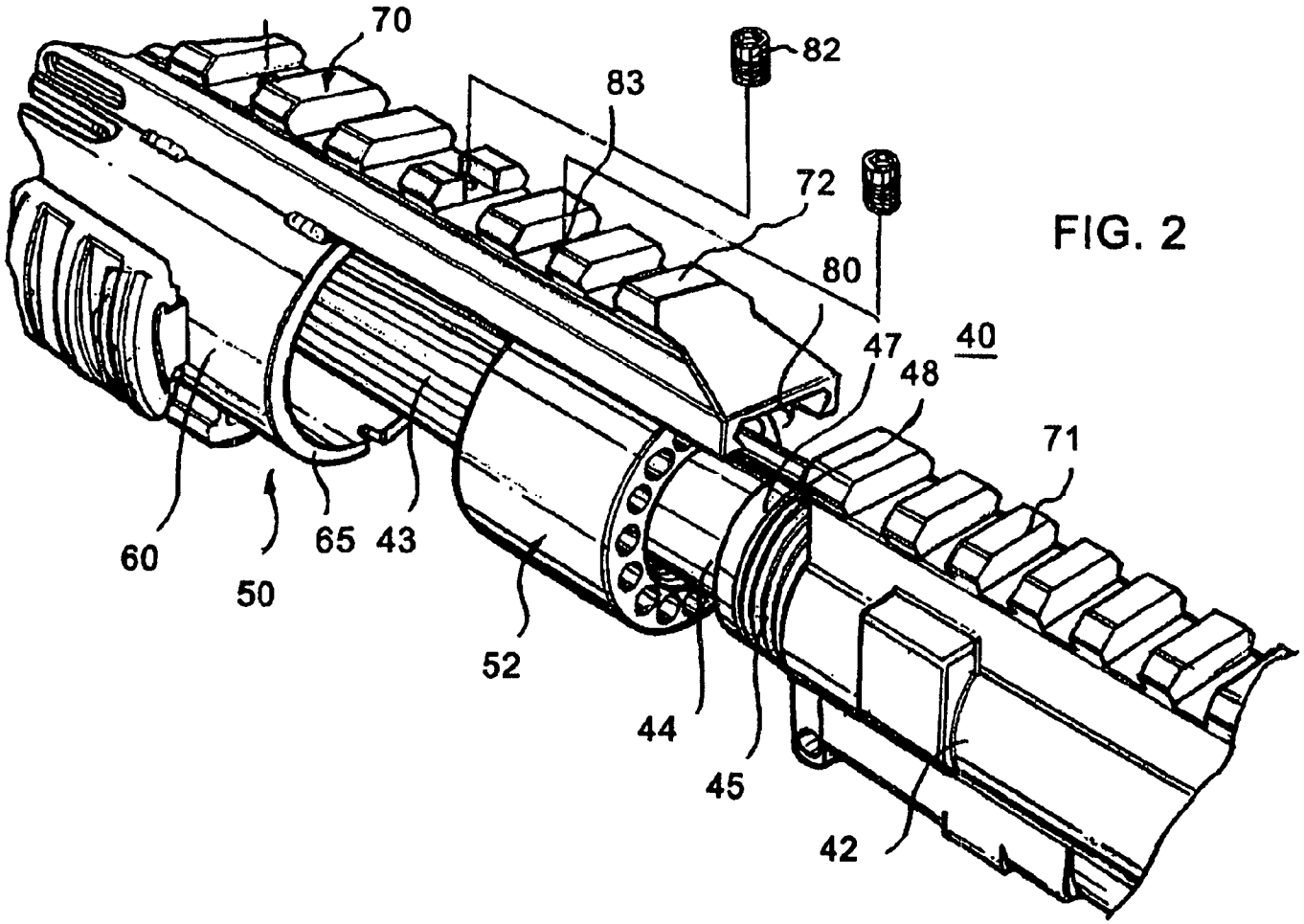
FIG. 2 is a exploded perspective view of the rifle of FIG; 1 with portions of the barrel and upper receiver illustrated, showing the conventional handguard replaced by a handguard system according to the present invention.

Turning now to the drawings in which like reference-characters indicate corresponding elements throughout the several views, attention is first directed to FIG. 1 which is a partial exploded view of a rifle 10 of the type referred to as an M16A2, illustrating an upper receiver 11, a barrel 12 and a handguard system 14. Barrel 12 has a base end 18 and a muzzle end 19. Handguard system 14 is used to cover barrel 12 intermediate base end 18 and muzzle end 19 to provide a comfortable grip and to provide protection for a shooter's hand from the heat of barrel 12 during firing. Base end 18 of barrel 12 is attached to upper receiver 11 by a barrel nut 20.

A spring loaded delta ring 22 fits over barrel nut 20 and is part of handguard system 14 for retaining an upper handguard 23 and a lower hand guard 24. Delta ring 22 is biased forwardly, toward muzzle end 19 of barrel 12 by a spring 26 and retaining ring 27. A front sight assembly 28 is fixed to barrel 12 proximate muzzle end 19 and includes a tube cap 30. The grip halves are fitted between delta ring 22 and tube cap 30. Insertion and removal is accomplished by forcing delta ring 22 rearwardly, against the bias, increasing the separation between delta ring 22 and tube cap 30. Ends of upper handguard 23 and lower hand guard 24 are inserted into delta ring 22, and the opposing ends are received by tube cap 30. Delta ring 22 is then permitted to return to the normal forward position, securing upper handguard 23 and lower hand guard 24. A gas tube 32 extends along barrel 12 between an operating mechanism carried by upper receiver 11 and tube cap 30. Gas tube 32 extracts gas from barrel 12 during firing and redirects it back to the operating mechanism.

While somewhat effective, attachment of both ends of the grip to the barrel can distort the accuracy of the rifle. Pressure or torque by the shooter on the hand guard translates directly into pressure on the barrel. Additionally, heating of the handguard by heat from the barrel can cause expansion of the handguard. Distortion of the handguard can put pressure on the barrel. Any pressure can flex the barrel, even to the slightest degree, which will cause a sighting error and deflection of the bullet.

Turning now to FIGS. 2 and 3, a portion of a rifle 40 is illustrated. Rifle 40 is illustrated as an M16A3, but it will be understood that other rifles similar to that described above can be modified with a handguard system according to the present invention, generally designated 50. A portion of an upper receiver 42 is illustrated with a barrel 43 having a base end 44 received by a barrel receiving receptacle 45 of upper receiver 42. A flange 47 extends around the outer circumference of barrel 43 proximate base end 44 of barrel 43 and abuts barrel receiving receptacle 45 when base end 44 is inserted into upper receiver 42. An alignment pin 48 extends from barrel 43 proximate flange 47 to facilitate proper alignment of barrel 43 when base end 44 is inserted into upper receiver 42. When barrel 43 is properly inserted and aligned, an integrated barrel nut 52 is threaded onto barrel receiving receptacle 45 of upper receiver 42 and engages flange 47, securely holding barrel 43 in position.

With additional reference to FIGS. 4 and 5, integrated barrel nut 52 includes an inner surface having a threaded portion 53 and a reduced portion 54 separated by a shoulder 55. Reduced portion 54 has a diameter smaller than the diameter of threaded portion 53 and flange 47, but sufficient to allow passage of barrel 43 therethrough. Threaded portion 53 is adapted to threadably engage barrel receiving receptacle 45, with shoulder 55 engaging flange 47. When threaded securely, integrated barrel nut 52 fastens barrel 43 to upper receiver 42 with shoulder 55 holding flange 47 against barrel receiving receptacle 45.

Still referring to FIGS. 2-5, integrated barrel nut 52 further includes an outer surface 57 having an outer diameter.

Still referring to FIGS. 2-5, integrated barrel nut 52 further includes an outer surface 57 having an outer diameter. Parallel passage 58 extend longitudinally through integrated barrel nut 52 intermediate the inner surface and outer surface 57, and are formed entirely about the circumference thereof. Passages 58 provide space through which an operating tube or push rod 59 passes. Since integrated barrel nut 52 must be threaded onto upper receiver 42, the plurality of passages 58 insures one will align properly.

Referring specifically to FIGS. 2, 3 and 6, once integrated barrel nut 52 is secured in position, a tubular handguard 60 is received about barrel 43. Handguard 60 has an end 65 defining an inner diameter slightly larger than the outer diameter of integrated barrel nut 52. End 65 is received about outer surface 57 of integrated barrel nut 52 and secured thereto by a rail extension which will be described presently, by a plurality of fasteners such as headed screws extending through apertures formed in handguard 60, or both. Handguard 60 is attached such that it is spaced from barrel 43 and attached only at integrated barrel nut 52. In this manner, a handguard is provided which is attached only at end 65 and thus will not deflect or put pressure on the barrel.

Turning now to FIGS. 2 and 6, handguard system 50 preferably includes a rail extension generally designated 70. Upper receiver 42 includes a rail portion 71 on an upper surface. Rail portion 71 is employed for the attachment of various accessories such as sights, scopes, etc. Often, however, the existing rail on upper receiver 42 is too short for many purposes. Thus, extension, rail 70 can be employed to extend the rail down barrel 43 along handguard 60.

Extension rail 70 is fastened to the top of cylindrical handguard 60 with a receiver portion 72 extending outwardly past end 65. Extension rail 70 can be fastened to handguard 60 in many diverse ways, but a preferred method will be described presently. As handguard 60 is received over barrel 43, receiver portion 72 of extension rail 70 is fitted over rail 71. Receiver portion 72 of extension rail 70 is formed with an underside defining a dovetail slot 80. Slot 80 is shaped to receive rail 71 therein. Receiver portion 72 of extension rail 70 is preferably of a length substantially identical to or shorter than the length of rail 71. In this manner, when handguard 60 is correctly positioned, receiver portion 72 of extension rail 70 substantially covers rail 71. If receiver portion 72 is shorter than rail 71, a portion of rail 71 is exposed for attachment of accessory devices. Receiver portion 72 of extension rail 70 is fastened to rail 71 with set screws 82 extending through apertures 83 and engaging the top of rail 71. Receiver portion 72 of extension rail 70 aligns with rail 71 such that apertures 83 overlie grooves or notches formed in rail 71. Set screws 82 extend through apertures 83 and into the notches of rail 71 preventing longitudinal movement thereof. While extending the rail, extension rail 70 additionally acts to reinforce and help stabilize handguard 60. Set screws 82 extend through the top of extension rail 70 and engage the top of rail 71. Thus, when tightened, set screws 82 force rail 70 from rail 71 securely engaging the dovetail equally on both sides.

Figure 7:
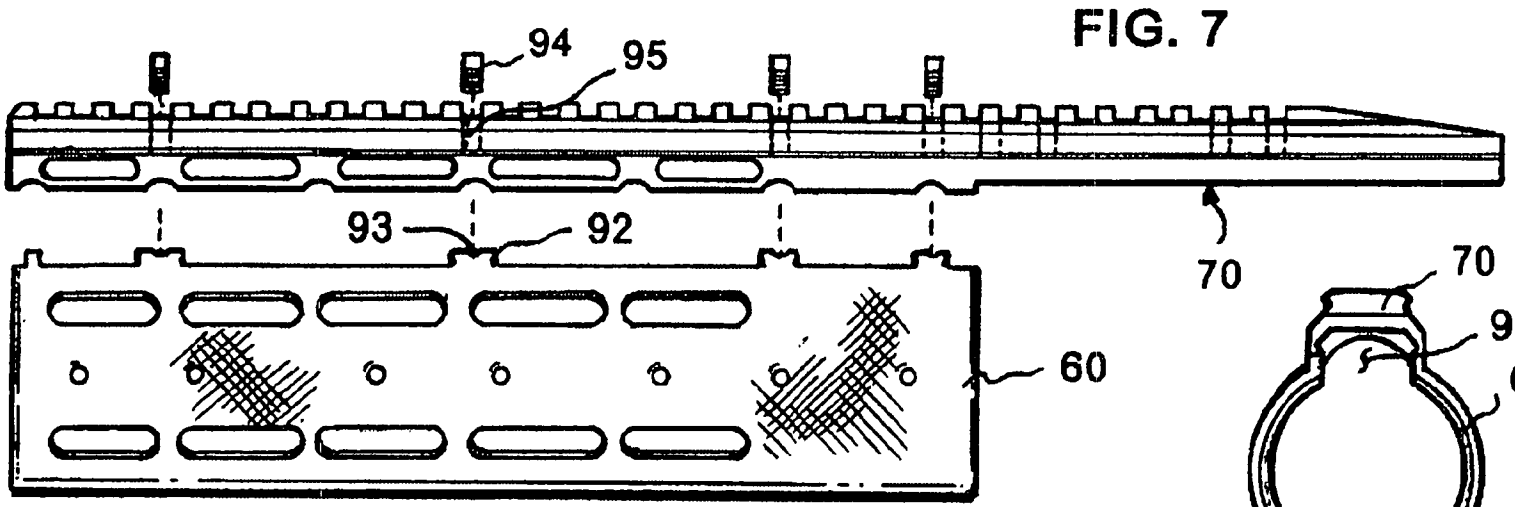
FIG. 7 is an exploded side plan view of the handguard and extension rail of the present invention.
Figure 9:
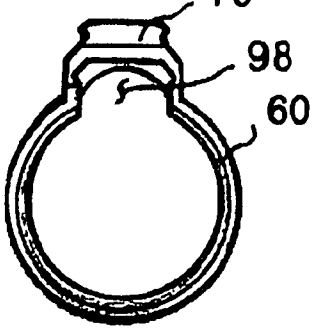
FIG. 9 is an end view of the handguard and extension rail of the present invention.
Figure 8:
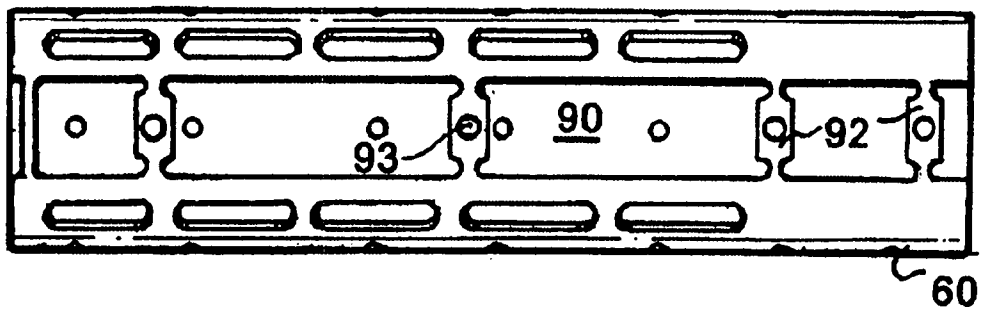
FIG. 8 is a top plan view of the handguard of the present invention.

Turning now to FIG. 7, a method of attaching extension rail 70 to handguard 60 is illustrated. With momentary reference to FIG. 8, handguard 60 includes space 90 extending longitudinally along an upper surface thereof. Opposing sides of Space 90 are intermittently connected by bridges 92, each having an aperture 93. Extension rail 70 is coupled to handguard 60 with screws 94 extending concurrently through apertures 95 formed therein and apertures 93. Once securely positioned, rail 70 is welded to handguard 60. Screws 94 are removed and bridges 92 are cut from the edges of space 90 and also removed. Referring now to FIG. 9, by removing bridges 92, a channel 98 is formed along handguard 60 and extension rail 70 which provides the space necessary for the operation of the push rod system.

Various changes and modifications to the embodiments herein chosen for,purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

[1. A handguard system for use on a rifle having a barrel and a receiver, the hand guard system comprising:

a barrel nut being a unitary element, having an inner surface with a threaded portion adapted to threadably engage the receiver for securing the barrel to the receiver and an outer surface; and a unitary tubular handguard having an end, the tubular handguard receivable about the barrel and received about the barrel nut, engaging the outer surface thereof.]

[2. A handguard system as claimed in claim 1 wherein the barrel nut further includes a plurality of passages positioned around the periphery of the barrel nut and extending longitudinally therealong intermediate the inner surface and the outer surface for permitting the passage of an element of an operating system therethrough.]

[3. A handguard system as claimed in claim 1 wherein the inner surface of the barrel nut further includes a reduced portion separated from the threaded portion by a shoulder, the reduced portion having a diameter smaller than a diameter of the threaded portion.]

[4. A handguard system as claimed in claim 1 wherein the receiver includes a rail, the system further including an extension rail coupled to the handguard, the extension rail including a receiver portion extending beyond the handguard, a dovetail groove formed in an underside of the receiver portion of the extension rail having a cross-sectional shape substantially identical to a cross-sectional shape of the rail on the receiver, for receipt of the rail therein, and fastening members for fastening the extension rail to the rail.]

[5. A handguard system as claimed in claim 4 wherein the fastening members extend through apertures formed in the top of the extension rail for engaging the top of the rail within notches formed therein.]

[6. A handguard system as claimed in claim 5 wherein the fasteners are set screws.]

[7. A handguard system as claimed in claim 4 wherein a portion of the tubular handguard underlying the extension rail is removed to form a channel therebetween.]

[8. A handguard system as claimed in claim 1 further including fasteners received through the end of the tubular handguard for engaging the barrel nut and fixedly securing the tubular handguard thereto.]

[9. A handguard system comprising:

an upper receiver;

a barrel having a base end and a muzzle end;

a barrel nut having an inner surface with a threaded portion threadably engaging the receiver and securing the barrel to the receiver and an outer surface; and a unitary tubular handguard having an end, the tubular handguard encircling the barrel and received about the barrel nut with the end of the tubular handguard engaging the outer surface of the barrel nut.]

[10. A handguard system as claimed in claim 9 wherein the barrel nut further includes a plurality of passages positioned around the periphery of the barrel nut and extending longitudinally therealong intermediate the inner surface and the outer surface for permitting the passage of an element of an operating system therethrough.]

[11. A handguard system as claimed in claim 9 wherein the inner surface of the barrel nut further includes a reduced portion separated from the threaded portion by a shoulder, the reduced portion having a diameter smaller than a diameter of the threaded portion, the shoulder engaging a flange on the base end of the barrel.]

[12. A handguard system as claimed in claim 9 wherein the receiver includes a rail, the system further including an extension rail coupled to the, handguard, the extension rail including a receiver portion extending beyond the handguard, a dovetail groove formed in an underside of the receiver portion of the extension rail having a cross-sectional shape substantially identical to a cross-sectional shape of the rail on the receiver, for receipt of the rail therein, and fastening members for fastening the extension rail to the rail.]

[13. A handguard system as claimed in claim 12 wherein the fastening members extend through apertures formed in the top of the extension rail to engage the top of the rail within notches formed therein.]

[14. A handguard system as claimed in claim 13 wherein the fasteners are set screws.]

[15. A handguard system as claimed in claim 12 wherein a portion of the tubular handguard underlying the extension rail is removed to form a channel therebetween.]

[16. A handguard system as claimed in claim 9 further including fasteners received through the end of the tubular handguard for engaging the barrel nut and fixedly securing the tubular handguard thereto.]

[17. A barrel nut for coupling a barrel to a receiver and receiving an end of a handguard having an inner surface, the barrel nut being a single unitary element comprising:

an inner surface with a threaded portion adapted to threadably engage the receiver for securing the barrel to the receiver and an outer surface for engaging the inner surface of the end of the handguard; and a plurality of passages positioned around the periphery of the barrel nut and extending longitudinally therealong intermediate the inner surface and the outer surface for permitting the passage of an element of an operating system therethrough.]

[18. A barrel nut as claimed in claim 17 wherein the inner surface of the barrel nut further includes a reduced portion separated from the threaded portion by a shoulder, the reduced portion having a diameter smaller than a diameter of the threaded portion.]

*19. A handguard system for use on a rifle having a barrel and a receiver, the hand guard system comprising:*

*a barrel nut being a unitary element, having an inner surface with a threaded portion adapted to threadably engage the receiver for securing the barrel to the receiver and a radial cylindrical outer surface;*

*a unitary tubular handguard having an end, the tubular handguard receivable about the barrel and removably received about the barrel nut, engaging only the radial cylindrical outer surface thereof; and*

*an extension rail extending beyond the handguard, the extension rail configured to contact a top portion of the receiver and align the unitary tubular handguard to the rifle;*

*wherein the engagement of the tubular handguard to the radial cylindrical outer surface extends substantially the entire length of the barrel nut.*

*20. A handguard system as claimed in claim 19 wherein the barrel nut further includes a plurality of passages positioned around the periphery of the barrel nut and extending longitudinally therealong intermediate the inner surface and the outer surface for permitting the passage of an element of an operating system therethrough.*

*21. A handguard system as claimed in claim 19 wherein the inner surface of the barrel nut further includes a reduced portion separated from the threaded portion by a shoulder, the reduced portion having a diameter smaller than a diameter of the threaded portion.*

*22. A handguard system as claimed in claim 19 wherein a portion of the tubular handguard includes a channel formed under the extension rail.*

*23. A handguard system as claimed in claim 19 wherein the top portion of the receiver includes a rail; and wherein a dovetail groove is formed in an underside of the extension rail having a cross-sectional shape substantially identical to a cross-sectional shape of the rail on the receiver, for receipt of the rail therein, and fastening members for fastening the extension rail to the rail.*

*24. A handguard system as claimed in claim 23 wherein the fastening members extend through apertures formed in the top of the extension portion for engaging the top of the rail within notches formed therein.*

*25. A handguard system as claimed in claim 24 wherein the fasteners are set screws.*

* * * * *